(12) United States Patent
Nilsson

(10) Patent No.: US 7,616,186 B2
(45) Date of Patent: Nov. 10, 2009

(54) ACCELERATION REFERENCE DEVICES, CELLULAR COMMUNICATION TERMINAL SYSTEMS, AND METHODS THAT SENSE TERMINAL MOVEMENT FOR CURSOR CONTROL

(75) Inventor: Jan Nilsson, Harlosa (SE)

(73) Assignee: Sony Ericsson Mobile Communications AB (SE)

( * ) Notice: Subject to any disclaimer, the term of this patent is extended or adjusted under 35 U.S.C. 154(b) by 703 days.

(21) Appl. No.: 11/298,740

(22) Filed: Dec. 9, 2005

(65) Prior Publication Data

US 2007/0132714 A1    Jun. 14, 2007

(51) Int. Cl.
*G09G 5/08* (2006.01)
(52) U.S. Cl. .................. 345/156; 345/157; 345/163; 345/166; 455/423; 455/422.1; 455/69; 455/67.11
(58) Field of Classification Search ......... 345/156–157, 345/163, 166
See application file for complete search history.

(56) References Cited

U.S. PATENT DOCUMENTS

| 2003/0016419 A1 * | 1/2003 | Palmer et al. ............. 359/154 |
| 2004/0259591 A1 | 12/2004 | Grams et al. |
| 2005/0007343 A1 | 1/2005 | Butzer |
| 2005/0050474 A1 | 3/2005 | Bells et al. |
| 2005/0212752 A1 * | 9/2005 | Marvit et al. ............. 345/156 |
| 2005/0243062 A1 | 11/2005 | Liberty |
| 2006/0092866 A1 | 5/2006 | Kim et al. |
| 2006/0208087 A1 | 9/2006 | Kressin et al. |
| 2007/0021065 A1 | 1/2007 | Sengupta et al. |

FOREIGN PATENT DOCUMENTS

| EP | 1 028 366 A2 | 8/2000 |
| JP | 2001-103395 A | 4/2001 |
| WO | WO 2006/036069 A1 | 4/2006 |
| WO | WO 2006/049506 A1 | 5/2006 |

OTHER PUBLICATIONS

International Search Report and Written Opinion; date of mailing Mar. 19, 2007.
International Search Report, PCT/EP2006/063545, Nov. 9, 2007.

* cited by examiner

*Primary Examiner*—Richard Hjerpe
*Assistant Examiner*—Leonid Shapiro
(74) *Attorney, Agent, or Firm*—Myers Bigel Sibley & Sajovec, P.A.

(57) ABSTRACT

An acceleration reference device comprises an accelerometer that is configured to generate acceleration information that is indicative of movement of the device; a communication interface that is configured to be communicatively coupled to a proximately located computer; a controller that is configured to generate movement information based on the acceleration information from the accelerometer and to communicate the acceleration information through the communication interface to the proximately located computer. The acceleration reference device cooperates with a cellular communication terminal configured to function as a mouse for the proximately located computer or for itself. Related terminal systems and methods are disclosed for using the device to provide mouse type functions.

20 Claims, 4 Drawing Sheets

ACCELERATION REFERENCE DEVICES, CELLULAR COMMUNICATION TERMINAL SYSTEMS, AND METHODS THAT SENSE TERMINAL MOVEMENT FOR CURSOR CONTROL

RELATED APPLICATION

This application is related to U.S. patent application Ser. No. 11/247,789 entitled CELLULAR COMMUNICATION TERMINALS AND METHODS THAT SENSE TERMINAL MOVEMENT FOR CURSOR CONTROL, filed on Oct. 11, 2005, by the same inventor, the contents of which are incorporated herein by reference.

FIELD OF THE INVENTION

The present invention relates to the field of digital computers in general and more particularly, to apparatus and methods for providing mouse input to a computer.

BACKGROUND OF THE INVENTION

Digital computers have evolved to include various different user interface devices that enable a user to steer a cursor around a screen to select among displayed menus and other objects and to perform various other functions. A computer mouse is one widely used type of user interface device. The mouse is usually connected by cable to the computer, but may instead be connected via a wireless interface. The mouse may use a roller ball or a light source (e.g., LED) coupled to a light sensor to sense movement of the mouse. Movement of the mouse is interpreted by the computer as, for example, a user command to move a cursor on the screen. The mouse generally includes several buttons that can be actuated by a user to, for example, signal the user's selection of a displayed menu or other object that is adjacent to the cursor.

In portable computer applications the mouse has the drawback of being separate from the computer. Accordingly, the user can be inconvenienced by the need to remember to bring along the mouse when traveling with or otherwise moving the computer, and by the need to separately pack both the computer and mouse. This inconvenience has prompted the evolution of other user interface devices that are integral to the computer, such as a touchpad disposed in the computer housing and a joystick associated with the computer keyboard.

In the above-mentioned related application, a cellular communication terminal can be configured to function as a mouse for a proximately located computer. The cellular communication terminal includes a cellular transceiver, a communication interface, an accelerometer, and a controller. The cellular transceiver is configured to communicate over a wireless cellular interface with a cellular network. The communication interface is configured to be communicatively coupled with the proximately located computer. The accelerometer is configured to generate acceleration information that is indicative of movement of the terminal. The controller is configured to communicate through the cellular transceiver with the cellular network according to a cellular communication protocol, and to selectively operate in a mouse mode during which the controller generates terminal movement information based on the acceleration information from the accelerometer and communicates the terminal movement information through the communication interface to the proximately located computer. It may also be configured to function as a mouse for the cellular communication terminal itself.

A potential drawback with this system may occur if a user brings the computer and the terminal on a means of transport which is itself accelerating relative to the earth. Then the acceleration information generated by the accelerometer is influenced by the acceleration of the means of transport and is generally not a true measure of the user's movements of the terminal relative to the computer.

An object of the present invention is to provide an arrangement providing a reference measurement of the acceleration of a reference frame in relation to which the acceleration of the terminal is to be measured.

SUMMARY OF THE INVENTION

In some embodiments of the present invention, an acceleration reference device is provided for measuring the acceleration of a reference frame and being connectable to a proximately located computer. The acceleration reference device comprises:

an accelerometer that is configured to generate acceleration information that is indicative of movement of the device;

a communication interface that is configured to be communicatively coupled to a proximately located computer;

a controller that is configured to generate movement information based on the acceleration information from the accelerometer and to communicate the acceleration information through the communication interface to the proximately located computer.

In some further embodiments, the communication interface comprises a short-range communication transceiver that is configured to communicate over a wireless interface with the proximately located computer; and the controller is configured to transmit the device movement information through the short-range communication transceiver to the proximately located computer.

The short-range communication transceiver may comprise a Bluetooth transceiver that is configured to communicate over a Bluetooth wireless interface, or a wireless local area network (WLAN) transceiver that is configured to communicate over a WLAN wireless interface, or an optical transceiver that is configured to communicate over an optical wireless interface via infra-red signals.

In some further embodiments, the communication interface comprises a Universal Serial Bus (USB) module; and the controller is configured to communicate the device movement information through the USB module to the proximately located computer.

In some further embodiments, the device is configured to be attached to the proximately located computer.

The device may be provided with a connector connectable to the proximately located computer, suitably a USB connector.

In some embodiments of the present invention, an acceleration reference device is provided for measuring the acceleration of a reference frame and being connectable to a proximately located cellular communication terminal. The acceleration reference device comprises:

an accelerometer that is configured to generate acceleration information that is indicative of movement of the device;

a communication interface that is configured to be communicatively coupled to a proximately located cellular communication terminal;

a controller that is configured to generate movement information based on the acceleration information from the accelerometer and to communicate the acceleration information through the communication interface to the proximately located cellular communication terminal.

In some further embodiments, the communication interface comprises a short-range communication transceiver that is configured to communicate over a wireless interface with the proximately located cellular communication terminal; and the controller is configured to transmit the acceleration reference device movement information through the short-range communication transceiver to the proximately located cellular communication terminal.

The short-range communication transceiver may comprise a Bluetooth transceiver that is configured to communicate over a Bluetooth wireless interface, or a wireless local area network (WLAN) transceiver that is configured to communicate over a WLAN wireless interface, or an optical transceiver that is configured to communicate over an optical wireless interface via infra-red signals.

In some embodiments of the present invention, a cellular communication terminal system can be configured to function as a mouse for a proximately located computer. A first accelerometer cooperates with a second accelerometer for sensing the acceleration of a reference frame which may be moving, but relative to which the mouse is to be considered fix. The cellular communication terminal system comprises a cellular communication terminal and an acceleration reference device, the cellular communication terminal comprising:

a cellular transceiver that is configured to communicate over a wireless cellular interface with a cellular network;

a first communication interface that is configured to be communicatively coupled to a proximately located computer;

a first accelerometer that is configured to generate acceleration information that is indicative of movement of the terminal;

a first controller that is configured to communicate through the cellular transceiver with the cellular network according to a cellular communication protocol, and to selectively operate in a mouse mode during which the first controller generates terminal movement information based on the acceleration information from the first accelerometer and communicates the acceleration information through the first communication interface to the proximately located computer;

the acceleration reference device comprising:

a second accelerometer that is configured to generate acceleration information that is indicative of movement of the acceleration reference device, separately from the information that is indicative of movement of the cellular communication terminal;

a second communication interface that is configured to be communicatively coupled to a proximately located computer;

a second controller that is configured to generate movement information based on the acceleration information from the second accelerometer and to communicate the acceleration information through the second communication interface to the proximately located computer.

In some further embodiments, the second communication interface comprises a short-range communication transceiver that is configured to communicate over a wireless interface with the proximately located computer; and the second controller is configured to transmit the terminal movement information through the short-range communication transceiver to the proximately located computer.

The short-range communication transceiver may comprise a Bluetooth transceiver that is configured to communicate over a Bluetooth wireless interface, or a wireless local area network (WLAN) transceiver that is configured to communicate over a WLAN wireless interface, or an optical transceiver that is configured to communicate over an optical wireless interface via infra-red signals.

In some further embodiments, the second communication interface comprises a Universal Serial Bus (USB) module; and the second controller is configured to communicate the acceleration reference device movement information through the USB module to the proximately located computer.

In some further embodiments, the acceleration reference device is configured to be attached to the proximately located computer.

The acceleration reference device may be provided with a connector connectable to the proximately located computer, suitably a USB connector.

In some embodiments of the present invention, a cellular communication terminal system can be configured to selectively operate in a mouse mode during which the controller moves the displayed indication of a user's selection responsive to relative movement information. The cellular communication terminal system comprises a cellular communication terminal and an acceleration reference device, the cellular communication terminal comprising:

a cellular transceiver that is configured to communicate over a wireless cellular interface with a cellular network;

a display device;

a first accelerometer that is configured to generate acceleration information that is indicative of movement of the cellular communication terminal; and a first controller that is configured to communicate through the cellular transceiver with the cellular network according to a cellular communication protocol, and to display on the display device information and an indicative of a user's selection among the displayed information, and configured to selectively operate in a mouse mode during which the controller moves the displayed indication responsive to the relative movement of the cellular communication terminal;

the acceleration reference device comprising:

a second accelerometer that is configured to generate acceleration information that is indicative of movement of the acceleration reference device, separately from the information that is indicative of movement of the cellular communication terminal;

a second communication interface that is configured to be communicatively coupled to the cellular communication terminal;

a second controller that is configured to generate movement information based on the acceleration information from the second accelerometer and to communicate the acceleration information through the second communication interface to the cellular communication terminal;

the cellular communication terminal being configured to calculate the relative terminal movement by subtracting the acceleration information of the second accelerometer from the acceleration information of the first accelerometer.

In some further embodiments, the displayed indication of a user's selection among displayed information comprises a cursor, and the controller is configured to move the displayed cursor responsive to the calculated relative terminal movement when in the mouse mode.

In some further embodiments, the second communication interface comprises a short-range communication transceiver that is configured to communicate over a wireless interface with the proximately located cellular communication terminal; and the second controller is configured to transmit the acceleration reference device movement information through the short-range communication transceiver to the proximately located cellular communication terminal.

The short-range communication transceiver may comprise a Bluetooth transceiver that is configured to communicate over a Bluetooth wireless interface, or a wireless local area network (WLAN) transceiver that is configured to communicate over a WLAN wireless interface, or an optical transceiver that is configured to communicate over an optical wireless interface via infra-red signals.

In some embodiments of the present invention, a computer can be configured to cooperate with a proximately located terminal functioning as a mouse. The computer comprises:

a first communication interface that is configured to be communicatively coupled to a proximately located terminal, said terminal comprising: a second communication interface that is configured to be communicatively coupled to said computer; a first accelerometer that is configured to generate acceleration information that is indicative of movement of the terminal; and a first controller that is configured to selectively operate in a mouse mode during which the first controller generates terminal movement information based on the acceleration information from the first accelerometer and to communicate the acceleration information through the communication interface to said computer;

said computer further comprising: a second accelerometer that is configured to generate acceleration information that is indicative of movement of the computer; a second controller that is configured to selectively operate in a terminal mouse mode during which the second controller generates relative terminal movement information based on the acceleration information from the first accelerometer and the second accelerometer.

In some further embodiments, the first communication interface comprises a short-range communication transceiver that is configured to communicate over a wireless interface with the proximately located terminal; and the second controller is configured to receive the terminal movement information through the short-range communication transceiver from the proximately located terminal.

The short-range communication transceiver may comprise a Bluetooth transceiver that is configured to communicate over a Bluetooth wireless interface, or a wireless local area network (WLAN) transceiver that is configured to communicate over a WLAN wireless interface, or an optical transceiver that is configured to communicate over an optical wireless interface via infra-red signals.

In some further embodiments, the first communication interface comprises a Universal Serial Bus (USB) module; and the second controller is configured to receive the terminal movement information through the USB module from the proximately located terminal.

In some further embodiments, the second controller is configured to calculate the relative terminal movement by subtracting the acceleration information of the second accelerometer from the acceleration information of the first accelerometer.

Some other embodiments of the present invention provide a method of using a cellular communication terminal as a computer mouse. The method comprises establishing communication through a communication interface in the terminal with a proximately located computer;

selectively operating the cellular communication terminal in a mouse mode responsive to a command from a user and/or and from the proximately located computer;

sensing acceleration information from a first accelerometer that is indicative of movement of the terminal;

sensing acceleration information from a second accelerometer that is indicative of movement of a reference frame in which the computer and the terminal may be moving;

selectively communicating terminal movement information that is based on the acceleration information through the communication interface to the proximately located computer when the terminal is operating in the mouse mode;

calculating the relative terminal movement by subtracting the acceleration information of the second accelerometer from the acceleration information of the first accelerometer.

Some other embodiments of the present invention provide a method of using a cellular communication terminal. The method comprises:

selectively operating the cellular communication terminal in a mouse mode responsive to a command from a user;

sensing at the cellular communication terminal acceleration information from a first accelerometer that is indicative of movement of the cellular communication terminal; sensing at an acceleration reference device acceleration information from a second accelerometer that is indicative of movement of the acceleration reference device;

calculating the relative terminal movement by subtracting the acceleration information of the second accelerometer from the acceleration information of the first accelerometer;

displaying on a display device of the cellular communication terminal information and an indication of a user's selection among the displayed information; and moving the displayed indication of a user's selection in response to the calculated relative terminal movement when the cellular communication terminal is operating in the mouse mode.

DETAILED DESCRIPTION

Figure 1:
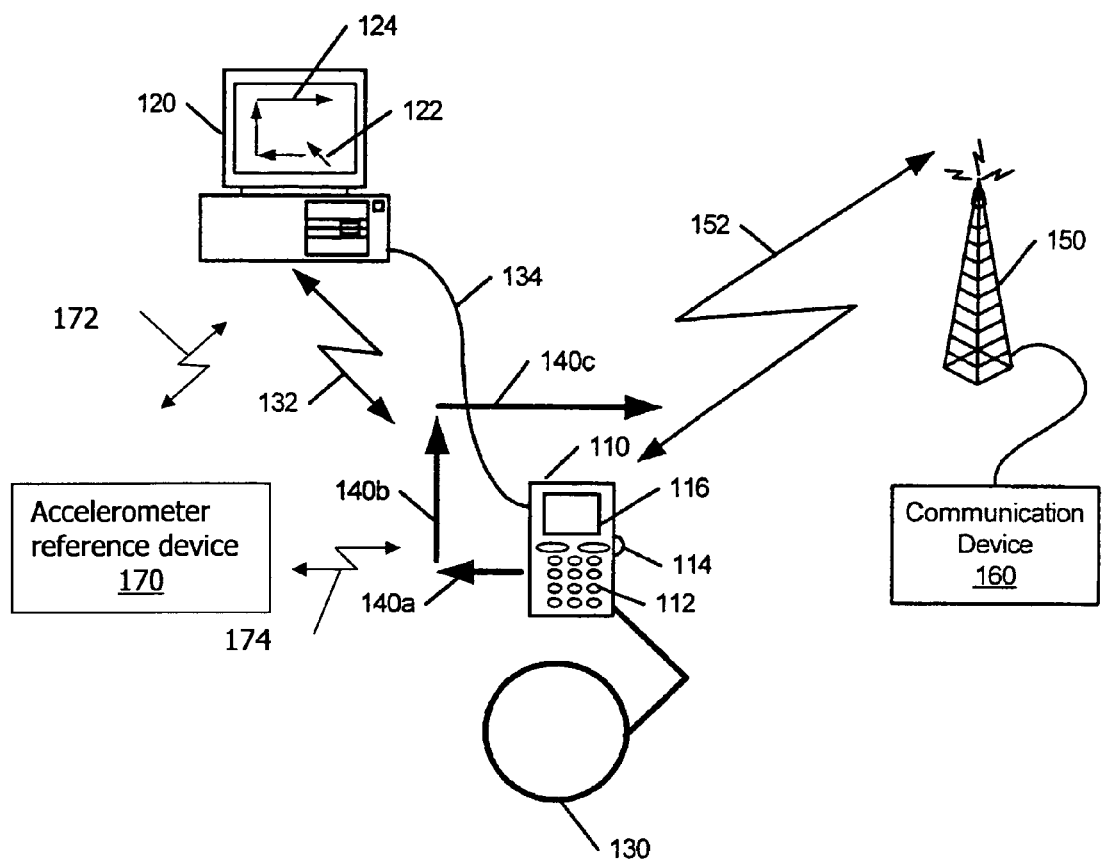
FIG. 1 is a block diagram that illustrates a cellular communication terminal that operates as a mouse for a computer together with an acceleration reference device over a wireless interface in accordance with some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. The common abbreviation "e.g.", which derives from the Latin phrase "exempli gratia," may be used to introduce or specify a general example or examples of a previously mentioned item, and is not intended to be limiting of such item.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Embodiments according to the present invention are described with reference to block diagrams and/or operational illustrations of methods, wireless communication terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "cellular communication terminal" or "cellular terminal" includes, but is not limited to, a cellular data terminal and/or telephone that is configured to communicate through a wireless (air) interface with a cellular network and to communicate through another communication interface, which may include a short range wireless interface such as, for example, a Bluetooth® wireless interface, a wireless local area network (WLAN) interface (e.g., IEEE 801.11a-g), and/or an optical interface via infra-red signals, and/or which may include a wired interface such as a Universal Serial Bus (USB).

FIG. 1 is a block diagram that illustrates a cellular terminal 110 that is configured to provide user interface functionality of a mouse for a proximately located computer 120. For example, a user 130 may move the cellular terminal 110 along the exemplary path 140a-c. The cellular terminal 110 senses its movement based on acceleration information (e.g., from accelerometers) and communicates an indication of that movement over a communication interface that includes a short-range communication interface 132 and/or a wired interface 134 to the computer 120. The short-range communication interface 132 may be, but is not limited to, a Bluetooth wireless interface, a WLAN interface, and/or an optical interface.

At the same time, the cellular terminal 110, the computer 120, and the user 130 may be located a means of transport, such as a train or airplane etc which is itself moving. The means of transport thus constitutes a moving reference frame. Then acceleration information generated by accelerometers is influenced by the acceleration of the means of transport and is generally not a true measure of the user's movements of the cellular terminal 110 relative to the computer 120. In order to account for the acceleration of the means of transport, a measurement separate from the accelerometers of the cellular terminal 110 is required. According to embodiments of the invention, an acceleration reference device 170 is provided. The acceleration reference device 170 should be moving together with the means of transport and experience the same acceleration. Then the acceleration of the cellular terminal 110 relative to the computer 120, or rather relative to the reference frame, equals the acceleration of the cellular terminal 110 minus the acceleration of the acceleration reference device 170.

The acceleration reference device 170 is in some embodiments integrated with the computer 120 and in other embodiments provided as a separate accessory. The acceleration reference device 170 is provided with over a communication interface that includes a short-range communication interface 172 and/or a wired interface 174 to the computer 120. The short-range communication interface 172 may be, but is not limited to, a Bluetooth wireless interface, a WLAN interface, and/or an optical interface.

In some embodiments, the computer 120 receives information about the acceleration of the cellular terminal 110 and the acceleration of the acceleration reference device 170 and performs the required calculation to obtain information about the movement of the cellular terminal 110 relative to the reference frame.

The computer 120 may respond to the received indicated movement of the cellular terminal 110 relative to the reference frame by, for example, moving a cursor 122 that is displayed on a display device of the computer 120 along a similar path 124. Accordingly, the user 130 may move the cellular terminal 110 along a tabletop to guide the cursor 122 on the display relative to information displayed by the computer 120. The user 130 may select among information displayed by the computer 120 adjacent to the cursor 122 by actuating one or more buttons 112 and/or a scroll wheel 116 of the cellular terminal 110. The cellular terminal 110 may further include a display device 116 on which it may display an indication of its sensed movement relative to the reference frame.

The cellular terminal 110 can be configured to communicate over a wireless cellular interface 152 with a cellular network 150. Accordingly, the cellular terminal 110 can be configured to selectively operate as a conventional cellular telephone or data terminal in cellular mode, and to operate as a mouse for the computer 120 in a mouse mode. The computer 120 may be, but is not limited to, a stationary personal computer (PC), a mobile PC such as laptop or palmtop PC, a personal data assistant (PDA), or any other computing device that is configured to respond to movement of another device as an indication of an input command from a user.

Figure 2:
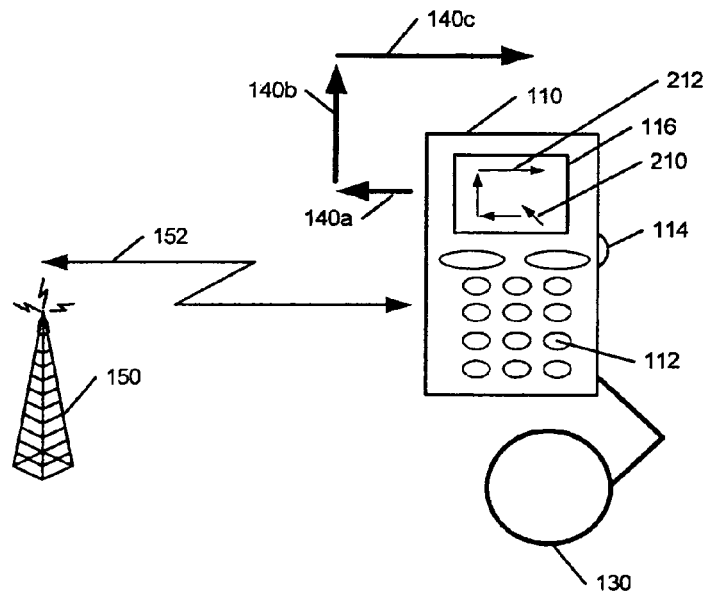
FIG. 2 is a block diagram that illustrates a cellular communication terminal that operates as a mouse for itself together with an acceleration reference device in accordance with some embodiments of the present invention.

With reference now to FIG. 2, in some other embodiments, the cellular terminal 110 may be configured to use its sensed movement relative to the reference frame as an indication of user input for one or more user applications that are resident in the cellular terminal 110 and/or applications that are resident within the cellular network 150 or resident in another device that is communicatively coupled to the cellular terminal 110 through the cellular network 150. The cellular terminal 110 may sense its movement along path 140*a-c* and receive information about the acceleration of the acceleration reference device 170 for responding to the movement relative to the reference frame as an indication of commands from a user.

For example, a user application that is resident on the cellular terminal 110 may display a cursor 210 on the display device 116 and may move the cursor 210 along a corresponding path on the display device 116 responsive to the sensed movement relative to the reference frame. The user 130 may select among information that is displayed on the display device 116 by actuating the buttons 112 and/or the scroll wheel 114. As a further example, the user 130 may move the cellular terminal 110 to steer the cursor 210 over an item in a displayed menu. The user 130 may click one of the buttons 112 to select the item and cause the user application to display a list of selectable sub-items. The user 130 may then use the scroll wheel 114 to scroll through and select among the sub-items.

The cellular network 150 can include conventional base station transceivers, mobile switching centers, and associated network infrastructure that enables communication between the terminal 110 and a remotely located communication device 160 that is coupled to the cellular network 150 through, for example, a public switched telephone network (PSTN), Internet, and/or via a cellular interface with the same or another cellular network. The cellular terminal 110 may communicate an indication of its sensed movement through the cellular interface 152 to one or more applications that are resident on the remotely located communication device 160. Such applications may respond to the communicated movement of the cellular terminal 110 as commands from the user 130, and may communicate back to the cellular terminal 110 one or more commands and/or data that causes a change in the displayed information and/or causes a change in operation of the cellular terminal 110. For example, the user may move the cellular terminal 110 to directly/indirectly cause an application in the communication device 160 to download/upload data, such as a text, music, video, and/or program operations (e.g., for game operation), through the cellular network 150 to/from the cellular terminal 110.

Figure 3:
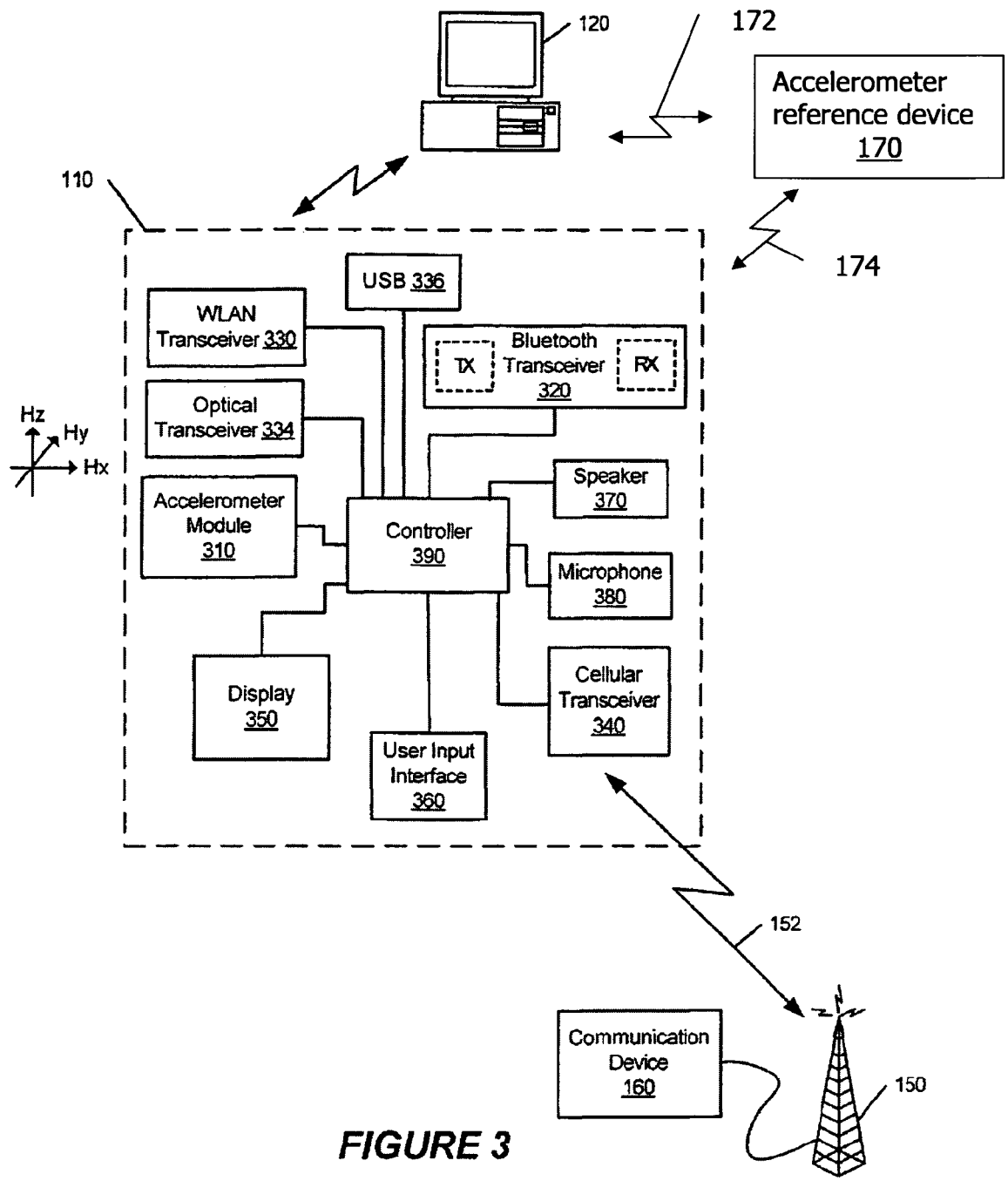
FIG. 3 is a block diagram that illustrates the cellular communication terminal together with the acceleration reference device of FIGS. 1 and 2 in accordance with some embodiments of the invention.

FIG. 3 is a schematic block diagram that illustrates in further detail the cellular terminal 110 configured in accordance with some embodiments of the present invention. The terminal 110 can include an accelerometer module 310, a Bluetooth transceiver 320, a WLAN transceiver 330, an optical transceiver 334, a USB module 336, a cellular transceiver 340, a display 350, a user input interface 360, a speaker 370, and a microphone 380 which are communicatively connected to a controller 390. Although the controller 390 has been illustrated as a single functional block to simplify the drawing, it is to be understood the function and operations described herein for the controller 390 may be distributed among a plurality of devices (e.g., a digital signal processor, general purpose processor, gate array, . . . ). The Bluetooth transceiver 320, WLAN transceiver 330, and optical transceiver 334 are configured to communicate through a short-range wireless communication interface with the proximately located computer 120 and with the proximately located acceleration reference device 170. The WLAN transceiver 330 may be compliant with, for example, IEEE 802.11a-g. Communication between the terminal 110 and the computer 120, and between the terminal 110 and the acceleration reference device 170, through the transceivers 320, 330, 334, may be direct without intervening devices or it may be indirect such as through a WLAN router that routes communications therebetween. The optical transceiver 334 may be configured to communicate via infra-red signals. The USB module 336 is configured to be communicatively coupled to a USB module in the computer 120.

The terminal 110 may thereby communicate with the computer 120 over short ranges, which may be, but are not limited to, less than about several hundred meters for communication through the WLAN transceiver 330, less than about 100 meters for the Bluetooth transceiver 320, and less than about 10 meters for the optical transceiver 334. The Bluetooth transceiver 320, WLAN transceiver 330, and optical transceiver 334 each typically include both a transmitter (TX) and a receiver (RX) (illustrated within the transceiver 320) to allow bi-directional communications, but the present invention is not limited to such transceivers and, as used herein, a "transceiver" may include only a transmitter. Although the terminal 110 is illustrated as having Bluetooth, WLAN, and optical transceivers 320, 330, 334, it may instead include less and/or other types of transceivers.

The controller 390 in combination with the cellular transceiver 340 is configured to communicate over the cellular interface 152 with the cellular network 150 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). Communication protocols as used herein may specify the information communicated, the timing, the frequency, the modulation, and/or the operations for setting-up and/or maintaining a communication connection.

The accelerometer module 310 is configured to generate acceleration information that is indicative of movement of the terminal 110. The accelerometer module 310 may include, for example, a solid-state acceleration sensor, such as a semiconductor acceleration sensor, and/or it may include a gyro, such as a rotating gyro and/or a ring laser gyro. The controller 390 is configured to selectively operate in a mouse mode during which it generates terminal movement information based on the acceleration information from the accelerometer module 310 and may transmit the terminal movement information through the Bluetooth transceiver 320, the WLAN transceiver 330, and/or the optical transceiver 334 and/or through the USB module 336 to the computer 120. The computer 120, the terminal 110, and/or the remotely located communication device 160 can include one or more applications that respond to the received terminal movement information as an indication of commands from a user, such as was described above with regard to FIGS. 1 and 2.

The accelerometer module 310 can be configured to generate acceleration information that is indicative of movement of the terminal 110 along directions that are substantially parallel to a surface on which the terminal 110 resides and to generate acceleration information that is indicative of movement of the terminal 110 in a direction away from and toward the surface. For example, the acceleration information may be indicative of movement of the terminal 110 along three orthogonal axes $H_x$, $H_y$, $H_z$. Two of the axes (e.g., $H_x$ and $H_y$) may form a plane that is substantially parallel to the surface on which the terminal 110 resides and the third axis (e.g., $H_z$) may be substantially orthogonal to the surface.

The controller 390 may be configured to reverse the direction of one of more of the axes and/or to swap two or more of the axes for one another. Accordingly, the indicated direction of movement of the terminal 100 along an axis may be reversed and/or it may be changed by mapping the movement to different directional axes. The controller 390 may be configured to display on the display device 350 a portion of information, and to change what portion of the information is displayed on the display device 350 responsive to the acceleration information from the accelerometer module 310. For example, the controller 390 may display a portion of a spreadsheet on the display device 350, and may scroll across the spreadsheet to display various different parts of the spreadsheet and/or to zoom in/out on portions of the spreadsheet in response to a user moving the terminal 110.

The controller 390 may be configured to determine from the acceleration information when the terminal 110 has been lifted from the surface on which it resides and then placed back on the surface. The controller 390 can also be configured to stop transmitting the terminal movement information to the computer 120 and/or the communication device 160 when the terminal 110 is determined to have been lifted from the surface and to resume transmitting the terminal movement information when the terminal 110 is determined to have been placed back on the surface. When the controller 390 includes a user application that responds to the terminal movement information, it may selectively provide the terminal movement information to the user application responsive to the determination of when the terminal 110 has been lifted from the surface. Accordingly, for example, when a user desires to signal terminal movement that would extend beyond an edge of a table on which the terminal 110 resides, the user may pick-up the terminal 110 and move it further from the table edge and then resume moving the terminal 110 in the desired direction. Accordingly, the controller 110 may be configured to not report terminal movement to a target application on the computer 120, terminal 110, and/or remote device 160 while the terminal 110 is lifted away from the table edge.

The controller 390 may be further configured to vary, based on a scale value, how fast the terminal 110 is indicated to be moving based on the acceleration information. For example, the controller 390 may scale the acceleration information based on the scale value to generate the terminal movement information transmitted to the computer 120 and/or the remote device 160, and/or that is used by a user application in the terminal 110. The scale value may be varied by a user of the terminal 110 and/or under control of another device such as the computer 120 and/or remote device 160.

The controller 390 may generate an indication of a user click of one or more buttons on a conventional mouse, such an indication of a user click of a right/left mouse button. The assignment of which of the keys 112 represents which mouse buttons may be, for example, reconfigurable in software responsive to a command from a user of the terminal 110, from the computer 120, and/or from the communication device 160. The controller 390 may monitor the acceleration information to identify occurrence of an abrupt movement of the terminal 110 (e.g., sharp pulse in the acceleration information), such as from a user tapping the terminal 110 on a hard surface. In response to identifying an abrupt movement of the terminal 110, the controller 390 may generate to the computer 120 an indication of a user selection of a defined button or other defined user input.

Figure 4:
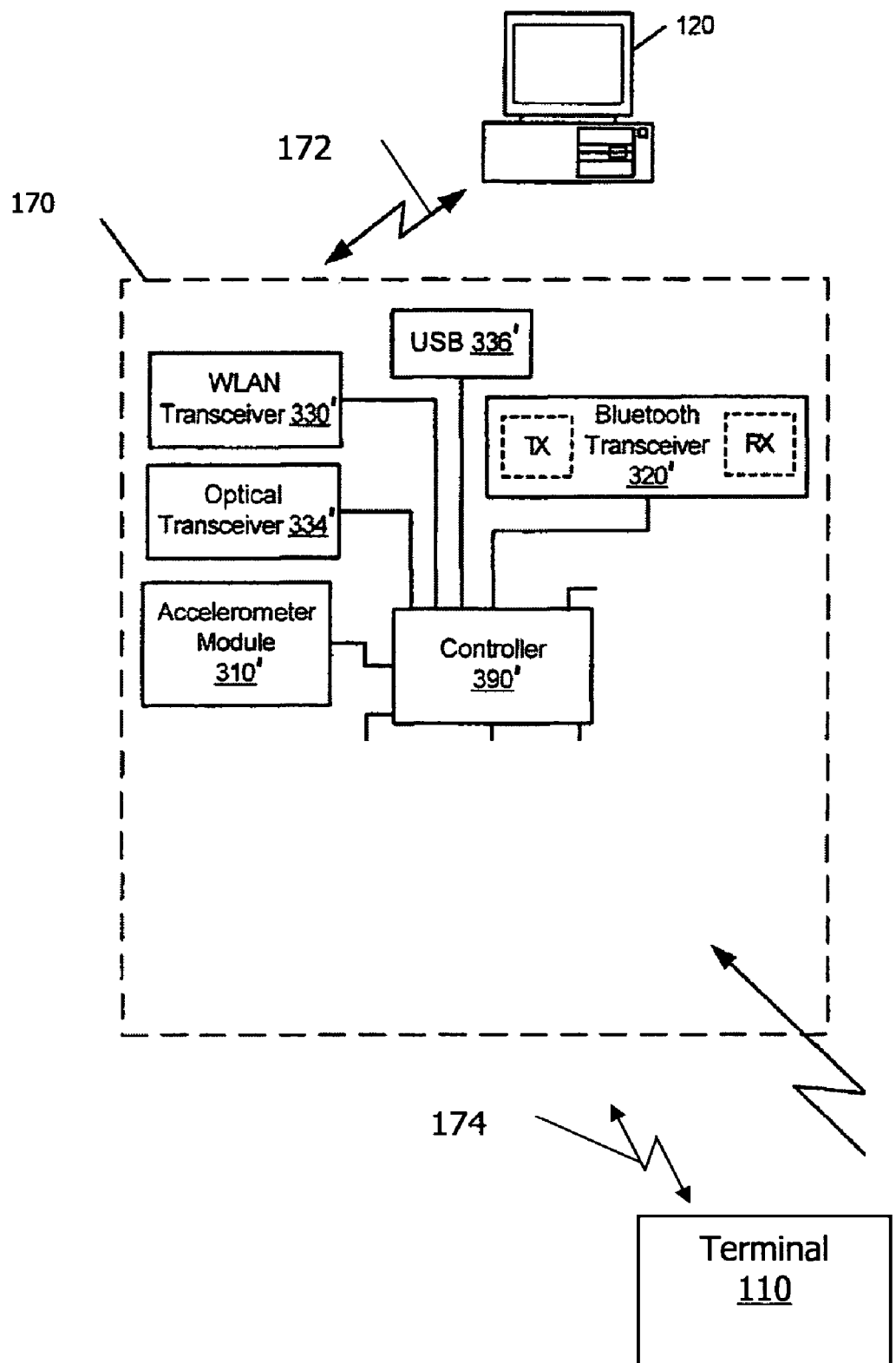
FIG. 4 is a block diagram that illustrates the acceleration reference device of FIGS. 1 and 3 in accordance with some embodiments of the invention.

FIG. 4 is a schematic block diagram that illustrates in further detail the acceleration reference device 170 configured in accordance with some embodiments of the present invention. The acceleration reference device 170 can include an accelerometer module 310', a Bluetooth transceiver 320', a WLAN transceiver 330', an optical transceiver 334', a USB module 336', which are communicatively connected to a controller 390'. Although the controller 390' has been illustrated as a single functional block to simplify the drawing, it is to be understood the function and operations described herein for the controller 390' may be distributed among a plurality of devices (e.g., a digital signal processor, general purpose processor, gate array, . . . ). The Bluetooth transceiver 320', WLAN transceiver 330', and optical transceiver 334' are configured to communicate through a short-range wireless communication interface with the proximately located computer 120 and with the proximately located terminal 110. The WLAN transceiver 330' may be compliant with, for example, IEEE 802.11a-g. Communication between the terminal 110 and the computer 120, and between the terminal 110 and the acceleration reference device 170, through the transceivers 320', 330', 334', may be direct without intervening devices or it may be indirect such as through a WLAN router that routes communications therebetween. The optical transceiver 334' may be configured to communicate via infra-red signals. The USB module 336' is configured to be communicatively coupled to a USB module in the computer 120.

The acceleration reference device 170 may thereby communicate with the computer 120 over short ranges, which may be, but are not limited to, less than about several hundred meters for communication through the WLAN transceiver 330', less than about 100 meters for the Bluetooth transceiver 320', and less than about 10 meters for the optical transceiver 334'. The Bluetooth transceiver 320', WLAN transceiver 330', and optical transceiver 334' each typically include both a transmitter (TX) and a receiver (RX) (illustrated within the transceiver 320') to allow bi-directional communications, but the present invention is not limited to such transceivers and, as used herein, a "transceiver" may include only a transmitter. Although the acceleration reference device 170 is illustrated as having Bluetooth, WLAN, and optical transceivers 320', 330', 334', it may instead include less and/or other types of transceivers.

The accelerometer module 310' is configured to generate acceleration information that is indicative of movement of the acceleration reference device 170. The accelerometer module 310' may include, for example, a solid-state acceleration sensor, such as a semiconductor acceleration sensor, and/or it may include a gyro, such as a rotating gyro and/or a ring laser gyro. The controller 390' is configured to selectively operate in a mode during which it generates movement information based on the acceleration information from the accelerometer module 310' and may transmit the movement information through the Bluetooth transceiver 320', the WLAN transceiver 330', and/or the optical transceiver 334' and/or through the USB module 336' to the computer 120 and/or the terminal 110. The computer 120, the terminal 110, and/or the remotely located communication device 160 can include one or more applications that respond to the received movement information to combine it with movement information from the terminal 110 as an indication of commands from a user, such as was described above with regard to FIGS. 1 and 2.

In use, the acceleration reference device 170 can be placed firmly on a surface of the means of transport, e.g. by means of rubber feet, or attached in any other suitable manner. The user can also keep the acceleration reference device 170 in his pocket, provided that he is sitting still. In some embodiments, the acceleration reference device 170 is attached to the computer 120, for example in a free socket or compartment that is not used. In some other embodiments, the acceleration reference device 170 comprises a USB connector secured to the body of the acceleration reference device 170 and is connected to a USB port of the computer 120.

Figure 5:
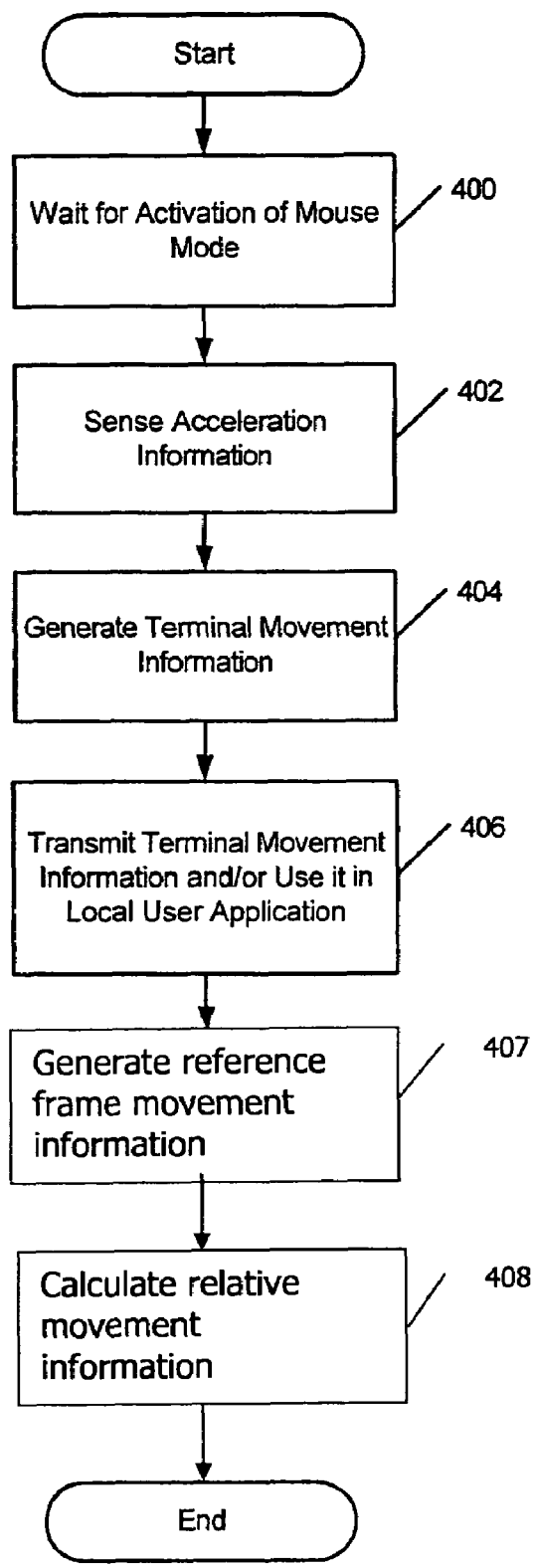
FIG. 5 is a flowchart that illustrates operations configured to operate a cellular communication terminal as a computer mouse together with an acceleration reference device.

FIG. 5 is a flowchart that illustrates operations configured to operate a cellular communication terminal as a computer mouse. Activation of a mouse mode is awaited at Block 400. The mouse mode may be activated by a user of the terminal 110 and/or by a command received from another device, such as the computer 120 and/or the communication device 160. Acceleration information from the accelerometer module 310 that indicates movement of the terminal 110 is sensed at Block 402. Terminal movement information is generated at Block 404 based on the acceleration information. As explained above, the acceleration information may be scaled in a variable manner when generating the terminal movement information to vary the relationship between the actual speed/distance moved by the terminal 110 and the speed/distance that is indicated by the terminal movement information. The indicated direction of movement indicated by the terminal movement information may be varied as described above by reversing/swapping the axes corresponding to the acceleration information. At block 406, the terminal movement information is transmitted and/or used in a user application that is local to the terminal 110. At block 407, reference frame movement information is generated based on the acceleration information from the accelerometer module 310'. At block 408, relative movement information is calculated from the terminal movement information and the reference frame movement information. The calculation may be performed in the computer 120 or in a user application that is local to the terminal 110.

As will be appreciated, the order of the operations illustrated by Blocks 402-406 may be varied. For example, the operations of Blocks 402, 404 and/or 407 may be carried out continuously irrespective of whether the mouse mode is active (e.g., Blocks 402, 404 and 407 may be carried out before Block 400.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A cellular communication terminal system comprising a cellular communication terminal and an acceleration reference device,
   the cellular communication terminal comprising:
   a cellular transceiver that is configured to communicate over a wireless cellular interface with a cellular network;
   a display device;
   a first accelerometer that is configured to generate acceleration information that is indicative of movement of the cellular communication terminal; and
   a first controller that is configured to communicate through the cellular transceiver with the cellular network according to a cellular communication protocol, and to display on the display device information and an indicative of a user's selection among the displayed information, and configured to selectively operate in a mouse mode during which the controller moves the displayed indication responsive to the relative movement of the cellular communication terminal;
   the acceleration reference device comprising:
   a second accelerometer that is configured to generate acceleration information that is indicative of movement of the acceleration reference device, separately from the information that is indicative of movement of the cellular communication terminal;
   a second communication interface that is configured to be communicatively coupled to the cellular communication terminal;
   a second controller that is configured to generate movement information based on the acceleration information from the second accelerometer and to communicate the acceleration information through the second communication interface to the cellular communication terminal; and
   the cellular communication terminal being configured to calculate the relative terminal movement by subtracting the acceleration information of the second accelerometer from the acceleration information of the first accelerometer.

2. A cellular communication terminal system according to claim 1, wherein the displayed indication of a user's selection among displayed information comprises a cursor, and the controller is configured to move the displayed cursor responsive to the calculated relative terminal movement when in the mouse mode.

3. A cellular communication terminal system according to claim 1, wherein:
   the first and second communication interface comprise a short-range communication transceiver that is configured to communicate over a wireless interface with the proximately located cellular communication terminal; and
   the second controller is configured to transmit the acceleration reference device movement information through the short-range communication transceiver to the proximately located second cellular communication terminal.

4. A cellular communication terminal system according to claim 3, wherein the second communication interface comprises a Universal Serial Bus (USB) module; and
   the second controller is configured to communicate the acceleration reference device movement information through the USB module to the proximately located second communication terminal.

5. A cellular communication terminal system according to claim 3, wherein the acceleration reference device is configured to be attached to one of the first and second terminals.

6. A cellular communication terminal system according to claim 5, wherein the acceleration reference device comprises a connector that is connectable to one of the first and second terminals.

7. A cellular communication terminal system according to claim 6, wherein the connector is a USB connector.

8. A cellular communication terminal system according to claim 3, wherein the short-range communication transceiver comprises a Bluetooth transceiver that is configured to communicate over a Bluetooth wireless interface.

9. A cellular communication terminal system according to claim 3, wherein the short-range communication transceiver comprises a wireless local area network (WLAN) transceiver that is configured to communicate over a WLAN wireless interface.

10. A cellular communication terminal system according to claim 3, wherein the short-range communication transceiver comprises an optical transceiver that is configured to communicate over an optical wireless interface via infra-red signals.

11. A computer comprising:
    a first communication interface that is configured to be communicatively coupled to a proximately located terminal, said terminal comprising: a second communication interface that is configured to be communicatively coupled to said computer; a first accelerometer that is configured to generate acceleration information that is indicative of movement of the terminal; and a first controller that is configured to selectively operate in a mouse mode during which the first controller generates terminal movement information based on the acceleration information from the first accelerometer and to communicate the acceleration information through the communication interface to said computer;

said computer further comprising: a second accelerometer that is configured to generate acceleration information that is indicative of movement of the computer;

a second controller that is configured to selectively operate in a terminal mouse mode during which the second controller generates relative terminal movement information based on the acceleration information from the first accelerometer and the second accelerometer.

12. A computer according to claim 11, wherein the first communication interface comprises a Universal Serial Bus (USB) module; and the second controller is configured to receive the terminal movement information through the USB module from the proximately located terminal.

13. A computer according to claim 11, wherein the second controller is configured to calculate the relative terminal movement by subtracting the acceleration information of the second accelerometer from the acceleration information of the first accelerometer.

14. A cellular communication system according to claim 1, wherein said cellular communication terminal is the first terminal and the system further comprising:

a first communication interface that is configured to be communicatively coupled to a proximately located second communication terminal, said second terminal comprising a second display device for displaying the information and indicative of the user's selection among the displayed information;

said first controller generates terminal movement information based on the acceleration information from the first accelerometer and communicates the acceleration information through the first communication interface to the proximately located second terminal; and wherein one of the first and second terminals being configured to calculate the relative terminal movement by subtracting the acceleration information of the second accelerometer from the acceleration information of the first accelerometer.

15. A computer according to claim 11, wherein:

the first communication interface comprises a short-range communication transceiver that is configured to communicate over a wireless interface with the proximately located terminal; and the second controller is configured to receive the terminal movement information through the short-range communication transceiver from the proximately located terminal.

16. A computer according to claim 11, wherein the short-range communication transceiver comprises a Bluetooth transceiver that is configured to communicate over a Bluetooth wireless interface.

17. A computer according to claim 11, wherein the short-range communication transceiver comprises a wireless local area network (WLAN) transceiver that is configured to communicate over a WLAN wireless interface.

18. A computer according to claim 11, wherein the short-range communication transceiver comprises an optical transceiver that is configured to communicate over an optical wireless interface via infra-red signals.

19. A method of using a cellular communication terminal as a computer mouse, the method comprising:

establishing communication through a communication interface in the terminal with a proximately located computer;

selectively operating the cellular communication terminal in a mouse mode responsive to a command from a user and/or and from the proximately located computer;

sensing acceleration information from a first accelerometer that is indicative of movement of the terminal;

sensing acceleration information from a second accelerometer that is indicative of movement of a reference frame in which the computer and the terminal may be moving;

selectively communicating terminal movement information that is based on the acceleration information through the communication interface to the proximately located computer when the terminal is operating in the mouse mode; and calculating the relative terminal movement by subtracting the acceleration information of the second accelerometer from the acceleration information of the first accelerometer.

20. A method of using a cellular communication terminal, the method comprising:

selectively operating the cellular communication terminal in a mouse mode responsive to a command from a user;

sensing at the cellular communication terminal acceleration information from a first accelerometer that is indicative of movement of the cellular communication terminal;

sensing at an acceleration reference device acceleration information from a second accelerometer that is indicative of movement of the acceleration reference device;

calculating the relative terminal movement by subtracting the acceleration information of the second accelerometer from the acceleration information of the first accelerometer; and displaying on a display device of the cellular communication terminal information and an indication of a user's selection among the displayed information; and moving the displayed indication of a users selection in response to the calculated relative terminal movement when the cellular communication terminal is operating in the mouse mode.

* * * * *